United States Patent [19]

Doering et al.

[11] Patent Number: 4,836,610
[45] Date of Patent: Jun. 6, 1989

[54] COLLECTOR CART

[75] Inventors: Charles W. Doering, Louisville; Garland E. Caudill, Bardstown, both of Ky.; Henry L. Johnson, Memphis, Ind.; Bruce A. Thomas, LaGrange, Ky.

[73] Assignee: Brinly-Hardy Co., Inc., Louisville, Ky.

[21] Appl. No.: 144,039

[22] Filed: Jan. 15, 1988

[51] Int. Cl.4 .................. A01D 34/12; B60P 7/02
[52] U.S. Cl. .................................. 298/6; 56/16.6; 56/202; 56/205; 298/17 B; 298/23 A; 298/23 C; 298/23 DF
[58] Field of Search ............. 298/5, 6, 17 B, 23 A, 298/23 C, 23 D, 23 DF, 23 F, 26; 56/16.6, 202, 205, 206

[56] References Cited

U.S. PATENT DOCUMENTS

| | | |
|---|---|---|
| 534,758 | 2/1895 | Pratt ........................ 298/17 B X |
| 649,925 | 5/1900 | Fisher ...................... 298/17 B X |
| 765,432 | 7/1904 | Lehr .............................. 298/6 |
| 1,024,959 | 4/1912 | Wolf ............................. 298/6 |
| 2,520,458 | 8/1950 | Doherty ......................... 298/6 |
| 4,158,279 | 6/1979 | Jackson ........................ 56/202 |
| 4,487,007 | 12/1984 | Mullet et al. ............... 56/202 X |
| 4,582,333 | 4/1986 | Doering ..................... 280/656 X |
| 4,699,393 | 10/1987 | Schweigert ................ 298/23 C X |

FOREIGN PATENT DOCUMENTS 1047716 11/1966 United Kingdom .......... 298/23 DF

Primary Examiner—Leslie J. Paperner
Attorney, Agent, or Firm—Frank C. Leach, Jr.

[57] ABSTRACT

A collector cart includes a body having an open rear end, which is closed by a canopy pivotally mounted adjacent its front end on the body adjacent its front end. The body has a support pivotally connected to caster wheel supports and a tow bar attached to a riding lawn mower hitch bar. Telescoping chutes connect the mower outlet with a canopy port to fill the cart with debris. When the cart is to be dumped, a linkage mechanism is activated by an operator, who remains on the mower, raising a lift handle to initially cause rearward shifting of the canopy relative to the body to release a locking connection of the rear of the canopy to the rear of the body. The body is released from its tow bar at the same time so that continued raising of the lift handle by the operator causes the body to pivot to a dumping position while the canopy pivots away from the body due to a rope of a fixed length connecting the front of the canopy to the mower.

23 Claims, 9 Drawing Sheets

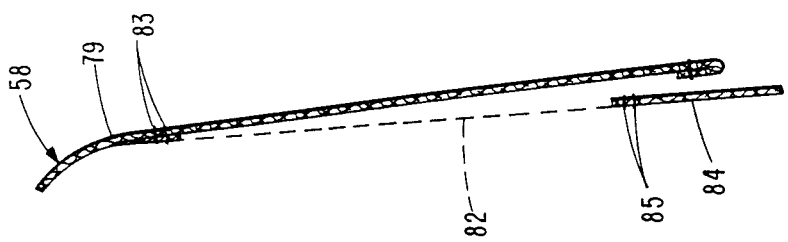
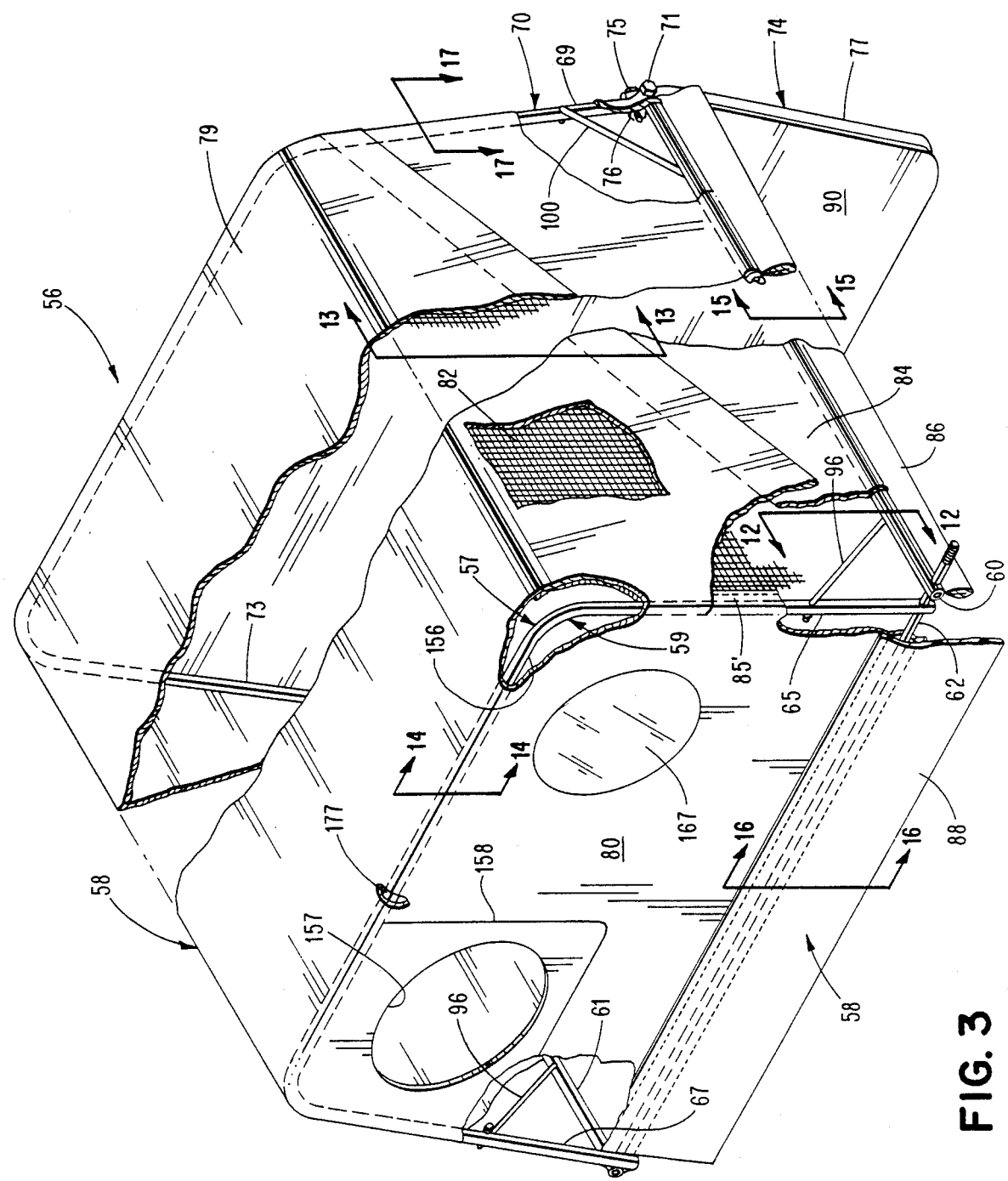
FIG. 13
FIG. 3

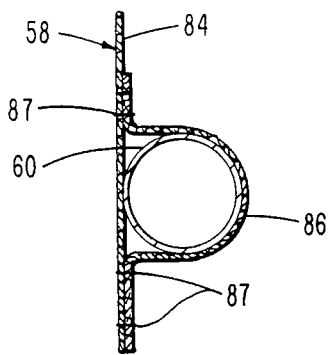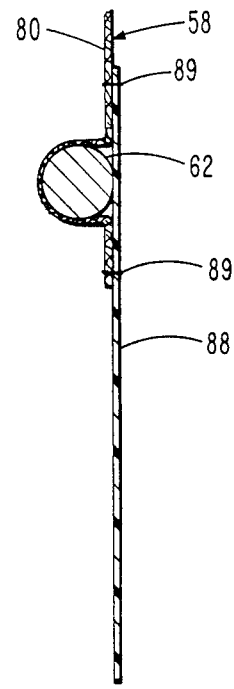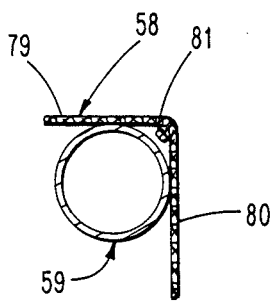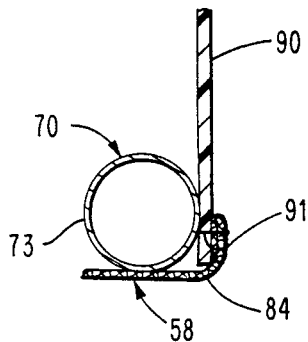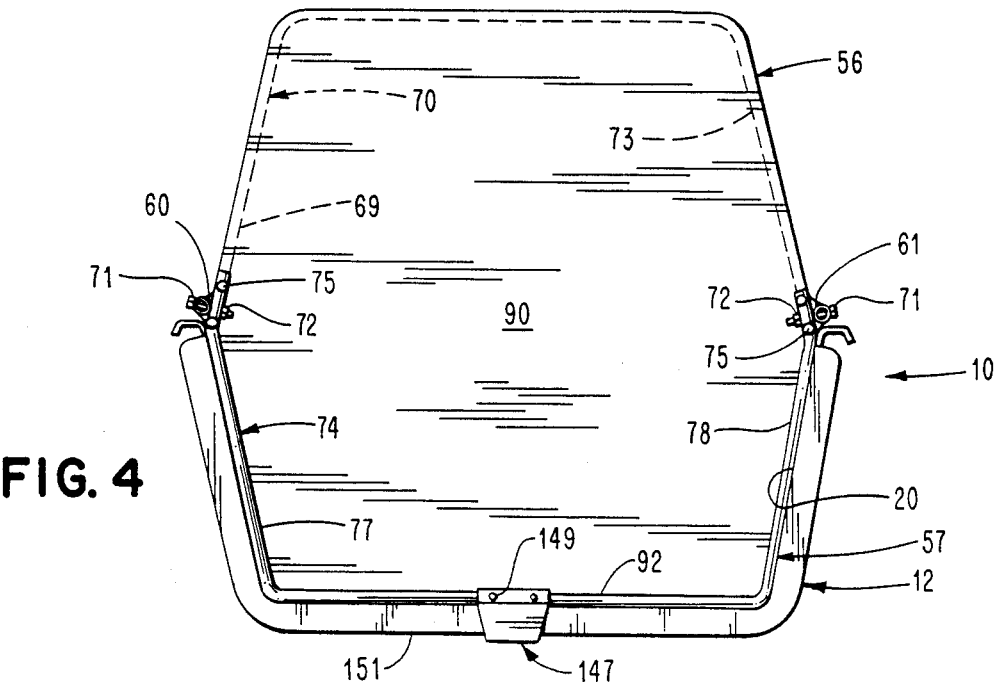

COLLECTOR CART

This invention relates to a cart for collecting debris and, more particularly, to a collector cart having a body and a canopy pivotally mounted on the body.

An operator of a riding lawn mower wants to complete cutting of a lawn in the shortest time period. At the same time, the operator of the riding mower normally desires to have all of the debris thrown from the outlet of the mower such as grass clippings, thatch, and leaves, for example, collected so that they do not fall on the cut lawn. Thus, it is desired for the thrown debris to be collected in a suitable collector.

Various types of collectors for collecting debris produced from a riding lawn mower have previously been suggested. These have included collector carts such as the collector carts of U.S. Pat. Nos. 3,522,695 to Musgrave and 4,158,279 to Jackson. The collection of thrown debris from a combine, for example, is disclosed in U.S. Pat. No. 3,351,384 to Huck.

Dumping carts having a pivotally mounted body with a cover that is moved away from the body prior to dumping are illustrated in each of U.S. Pat. Nos. 831,428 to Guiry and 1,024,959 to Wolf. In the aforesaid Wolf patent, the cover is moved away during pivoting of the cart to its dumping position with the cover moving forwardly and pivoting away from the body.

The aforesaid Jackson patent has a cart towed by a riding lawn mower with the cart including a body, which is pivotally mounted on an axle of wheels of the cart and a canopy pivotally mounted at the front end of the cart. When the debris in the cart is to be dumped, it is necessary for the operator of the riding lawn mower to get off of the lawn mower, unlock the rear of the canopy from the rear of the body, and then push the rear end of the canopy upwardly to cause the canopy to pivot relative to the body with the body pivoting about the axle of the cart wheels in response to the canopy being pivoted.

Therefore, the collector cart of the aforesaid Jackson patent has the problem of the engine being turned off, either manually or automatically, when the operator gets off the seat. Additionally, the body of the cart of the aforesaid Jackson patent has a slanting rear wall, which engages the ground during dumping to support the body, so that all of the debris within the canopy and the body cannot fall therefrom by gravity. Accordingly, it is necessary for the operator to have to clean out a portion of the debris within the collector cart body when dumping the debris from the cart of the aforesaid Jackson patent.

Another problem with the collector cart of the aforesaid Jackson patent is that the debris is compressed within the canopy and the cart body so as to bulge against the canopy. This produces a substantial resistance to the normal lifting forces to raise the canopy from its closed position.

A further problem with the collector cart of the aforesaid Jackson patent is that the wheels are mounted on the ends of an axle and must track the mower. Thus, it is sometimes difficult to back up the collector cart of the aforesaid Jackson patent without jackknifing. Since it is necessary to normally back up the cart to where the debris is to be dumped, the fixed tracking arrangement of the cart wheels presents a problem for the operator of the riding mower to correctly maneuver the cart in response to motions of the mower.

The collector cart of the present invention satisfactorily solves the foregoing problems through providing a collector cart for use with a riding lawn mower in which it is not necessary for the operator to get off of the riding lawn mower when it is desired to dump debris from the collector cart. Therefore, the engine does not have to be turned off.

The collector cart of the present invention also eliminates the debris from providing a resistance to normal lifting of the canopy when it is to be opened. This is accomplished through shifting the canopy slightly rearwardly relative to the cart body before any pivoting occurs. This rearward shifting of the canopy also disconnects a locking arrangement of the rear of the canopy to the rear of the cart body so that the canopy is locked when in use but is still unlocked when desired without the operator having to get off of the riding lawn mower.

The collector cart of the present invention also is capable of dumping its entire contents. This is accomplished through forming the cart body with an open rear end, which is closed by the canopy. Accordingly, the cart body has no rear wall to block the flow of debris by gravity from the cart body when the cart is in its dumping position.

The movement of the collector cart to its dumping position is accomplished through the operator, while seated on the riding lawn mower, grasping a lift handle on the front of the cart body to actuate a linkage mechanism. The linkage mechanism initially shifts the canopy rearwardly relative to the cart body. During the final portion of this rearward shifting of the canopy, the cart body is unlocked so that the linkage mechanism can cause pivoting of the cart body to its dumping position after rearward shifting of the canopy is completed. The canopy responds to the pivoting of the cart body through having its upper front end connected to the riding lawn mower by connecting means of a fixed length such as a rope, for example.

The collector cart of the present invention overcomes the tracking problem of the collector cart of the aforesaid Jackson patent by utilizing caster wheels. These enable the collector cart to be moved in a rearward direction in response to the riding lawn mower without substantial maneuvering by the operator of the riding lawn mower while still being capable of tracking the mower in the forward direction.

An object of this invention is to provide a collector cart for collecting debris.

Another object of this invention is to provide a collector cart having a single actuating mechanism for both unlocking a canopy of the cart from a body of the cart and creating relative pivoting between the body and the canopy to enable dumping of the contents of the cart.

Other objects of this invention will be readily perceived from the following description, claims, and drawings.

This invention relates to a collector cart for towing by pulling means including a body having a bottom wall, side walls, a front wall, and an open rear end. Body mounting means mounts the body for pivotal movement relative to wheel means and for support thereby. A canopy includes a frame and a cover mounted on the frame. The frame is mounted on the body by frame mounting means for both longitudinal and pivotal movement of the canopy between a closed position and a dumping position with the cover of the canopy having means to receive debris into its interior and the interior of the body when the canopy is mounted on the body. The frame includes means to close the open rear end of the body when the canopy is in its closed position when mounted on the body. Actuating means causes longitudinal shifting of the frame relative to the body prior to causing pivoting of the body relative to the wheel means. First causing means causes pivoting of the frame relative to the body during pivoting of the body relative to the wheel means by the actuating means.

The attached drawings illustrate a preferred embodiment of the invention, in which:

FIG. 3 is a perspective view, partly in section with parts broken away, of a canopy of the cart of FIG. 1;

FIG. 4 is a rear elevational view of the body and the canopy of the cart of FIG. 1 in its towed position with other parts omitted for clarity purposes;

FIG. 13 is a fragmentary sectional view of a portion of the cover material of the canopy and taken along line 13—13 of FIG. 3;

FIG. 14 is a fragmentary sectional view of a portion of the cover material of the canopy showing the connection between a main central portion and a front portion and taken along line 14—14 of FIG. 3;

FIG. 15 is a fragmentary sectional view of a portion of the canopy showing the arrangement for connecting a side tube of the canopy frame to the cover material of the canopy and taken along line 15—15 of FIG. 3;

FIG. 16 is a fragmentary sectional view of a portion of the canopy cover showing the relation between the front portion of the cover material of the canopy and a front pivot rod of the canopy frame about which the canopy frame pivots and taken along line 16—16 of FIG. 3;

FIG. 17 is a fragmentary sectional view of a portion of the cover material of the canopy showing the connection of a rear end closure of the canopy and a portion of the cover material of the canopy and taken along line 17—17 of FIG. 3;

Figure 1:
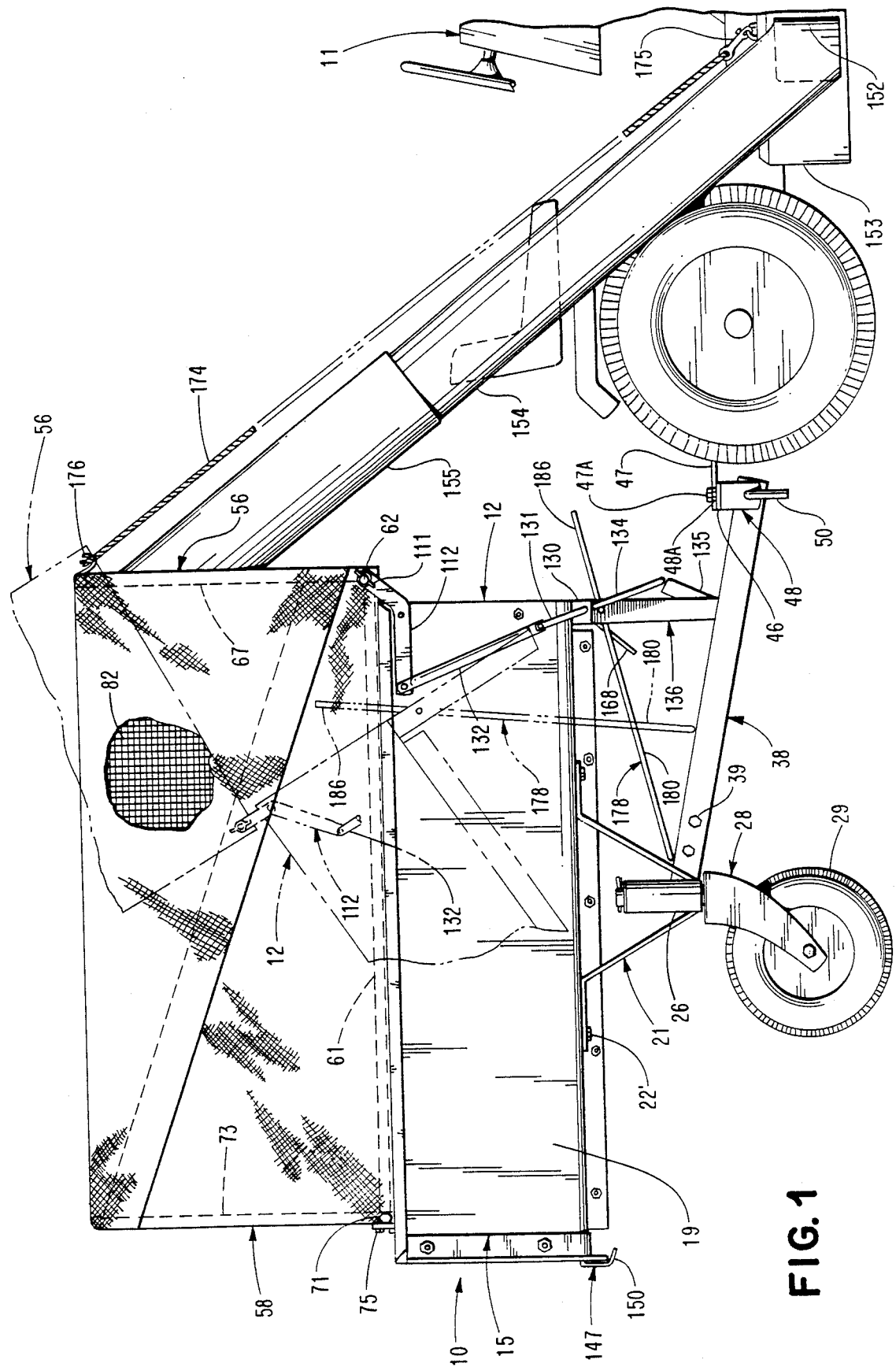
FIG. 1 is a right side elevational view of the cart of the present invention attached to a riding lawn mower and showing the cart is its towed position in solid lines and in its dumping position in phantom lines.
Figure 18:
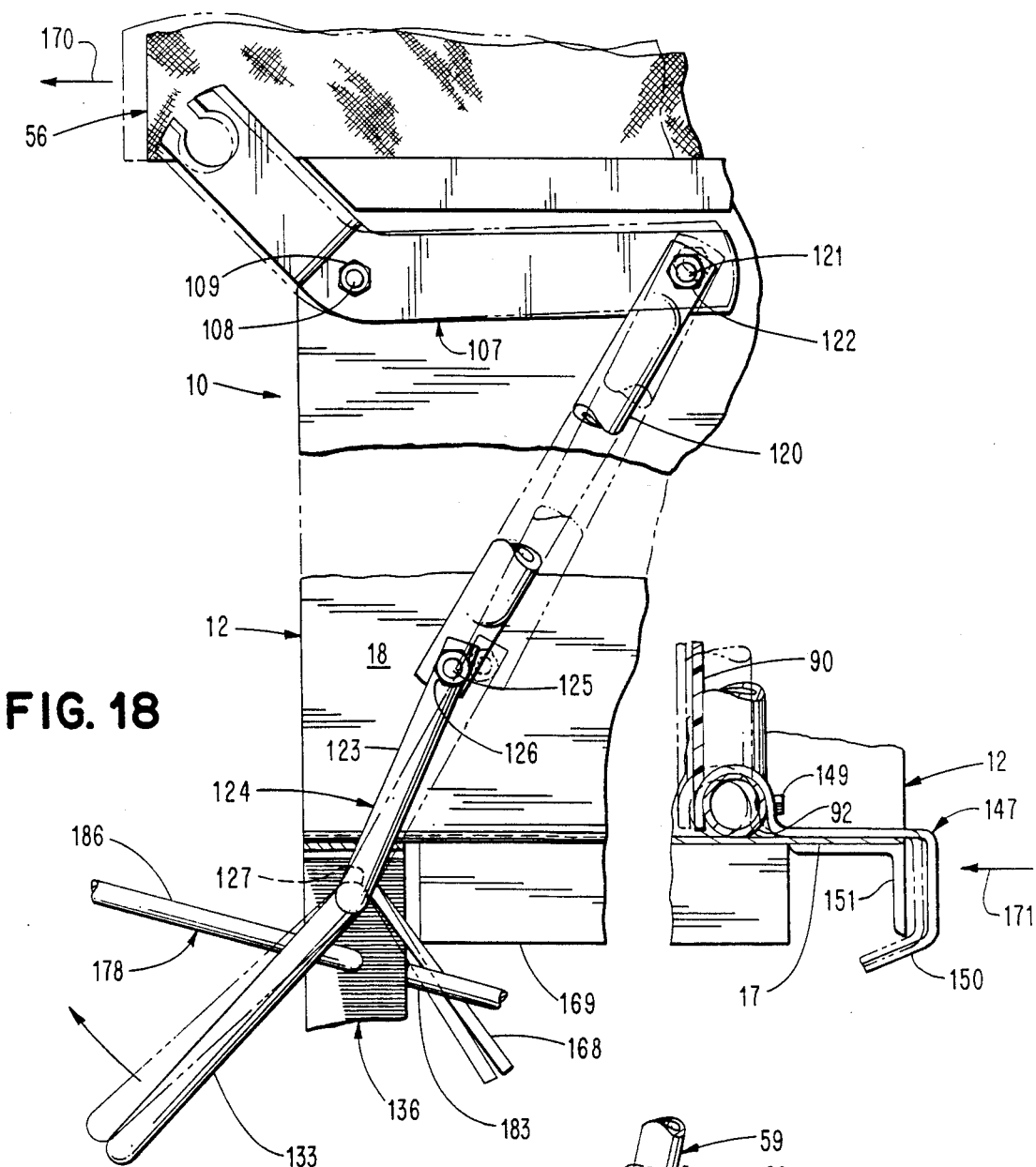
FIG. 18 is a fragmentary left side elevational view of a portion of the cart of FIG. 1 with a connecting rod omitted for clarity purposes and showing the linkage mechanism with the cart in its towed portion in solid line position and the initial motion of the linkage mechanism in phantom line position.
Figure 19:
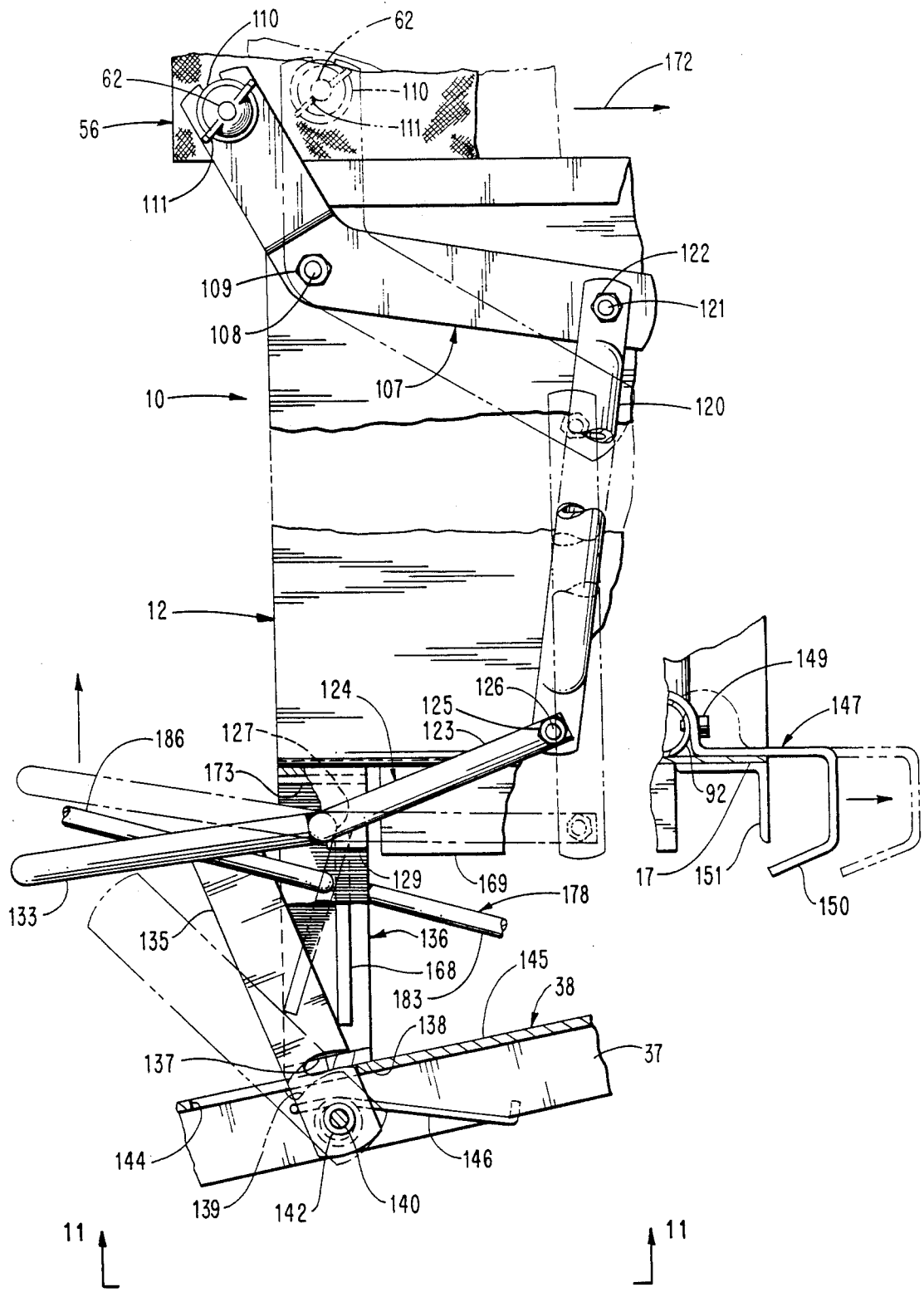
Figure 20:
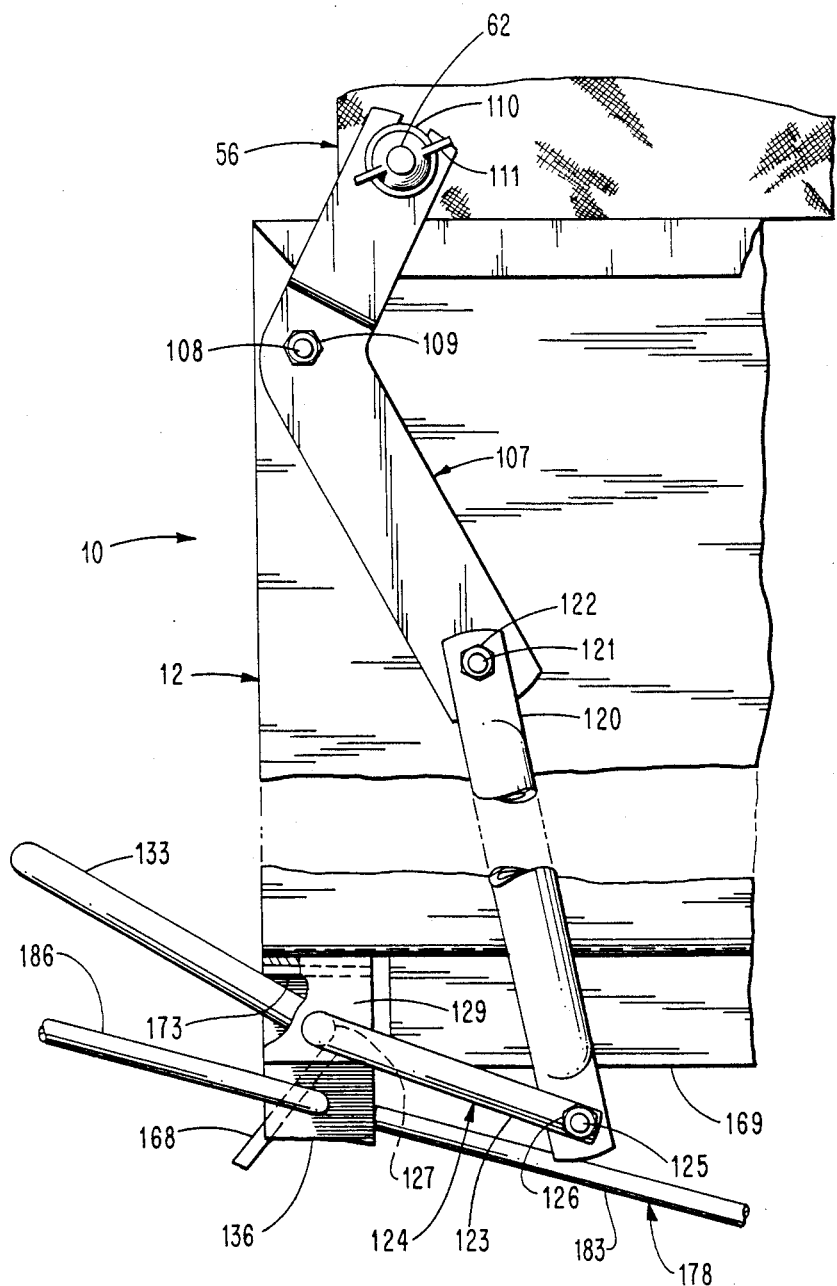

FIG. 19 is a fragmentary left side elevational view, similar to FIG. 18, of a portion of the cart of FIG. 1 but showing the linkage mechanism starting rearward movement of the canopy in solid line position and rearward motion of the canopy completed and the cart body starting to be unlocked from the tow bar in phantom line position; and FIG. 20 is a fragmentary left side elevational view of a portion of the cart of FIG. 1 and showing the linkage mechanism in the position in which the lift handle engages the body of the cart to start pivoting of the cart to its dumping position.

Referring to the drawings and particularly FIG. 1, there is shown a collector cart 10 for collecting thrown debris such as grass clippings and leaves, for example, from a riding lawn mower 11, for example, which tows or pulls the collector cart 10 behind it. The collector cart 10 includes a body 12 formed of two mirror image portions 14 (see FIG. 2) and 15 and a front wall 16. The front wall 16 and the mirror image portions 14 and 15 are formed and connected to each other in the same manner as shown in U.S. Pat. No. 4,582,333 to Doering.

The mirror image portions 14 and 15 provide a bottom wall 17 of the body 12. The mirror image portion 14 provides a side wall 18 of the body 12, and the mirror image portion 15 provides a side wall 19 of the body 12. The body 12 has an open rear end 20 (see FIG. 4) between the side walls 18 (see FIG. 2) and 19.

Figure 6:
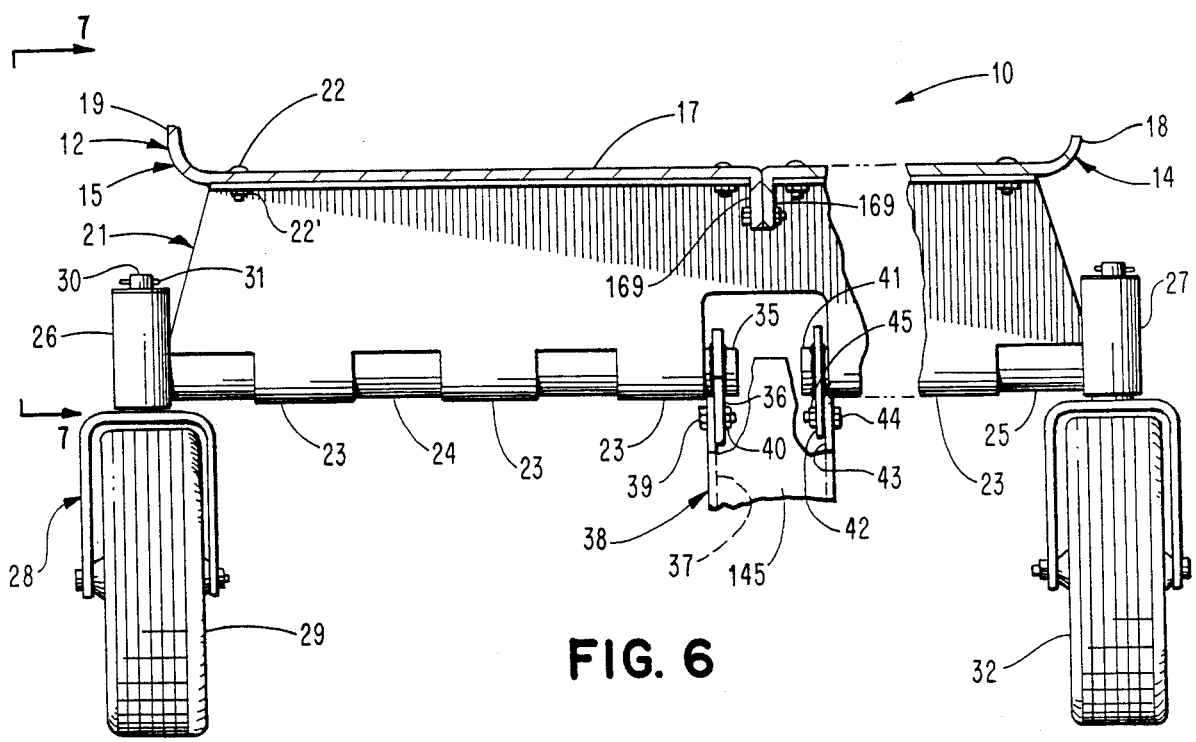
FIG. 6 is a front elevational view of a portion of the cart of FIG. 1 and showing the connection of the tow bar to the body of the cart through an axle support that also supports caster pivot tubes.
Figure 7:
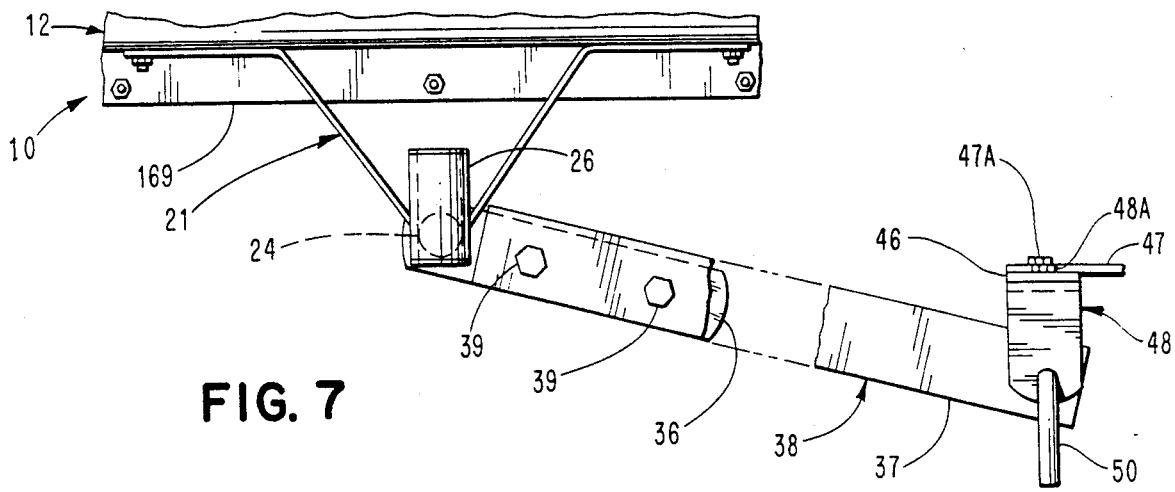
FIG. 7 is a fragmentary side elevational view of FIG. 6 and taken along line 7—7 of FIG. 6 but without caster wheels and showing the tow bar of the cart connected to the hitch bar of the riding lawn mower.

The bottom wall 17 of the body 12 has an axle support 21 (see FIG. 6) attached thereto by suitable means such as bolts 22 and nuts 22', for example. The axle support 21 has retainers 23 to receive dump pivot bars 24 and 25, which are axially aligned with each other. The dump pivot bar 24 has a caster pivot tube 26 fixed to its outer end. Similarly, the dump pivot bar 25 has a caster pivot tube 27 fixed to its outer end.

A caster wheel mount 28, which has a caster wheel 29 rotatably supported thereby, has a vertical post 30 extending through the caster pivot tube 26 and held therein by a cotter pin 31 extending through a bore in the upper end of the vertical post 30 of the caster wheel mount 28. A caster wheel 32 is similarly mounted in the caster pivot tube 27.

The dump pivot bar 24 has its inner end 35 supported in an opening (not shown) in a plate 36 and fixed thereto by welding. The plate 36 is secured to a side wall 37 of a U-shaped tow bar 38 by bolts 39 and nuts 40. Similarly, the dump pivot bar 25 has its inner end 41 supported in an opening (not shown) in a plate 42 and fixed thereto by welding. The plate 42 is secured to a side wall 43 of the tow bar 38 by bolts 44 and nuts 45.

Accordingly, the tow bar 38 and the caster wheels 29 and 32 are integral with each other. The body 12 is pivotally mounted with respect to the caster wheels 29 and 32 and the tow oar 38 through the body 12 being rotatably mounted on the dump pivot bars 24 and 25.

Figure 5:
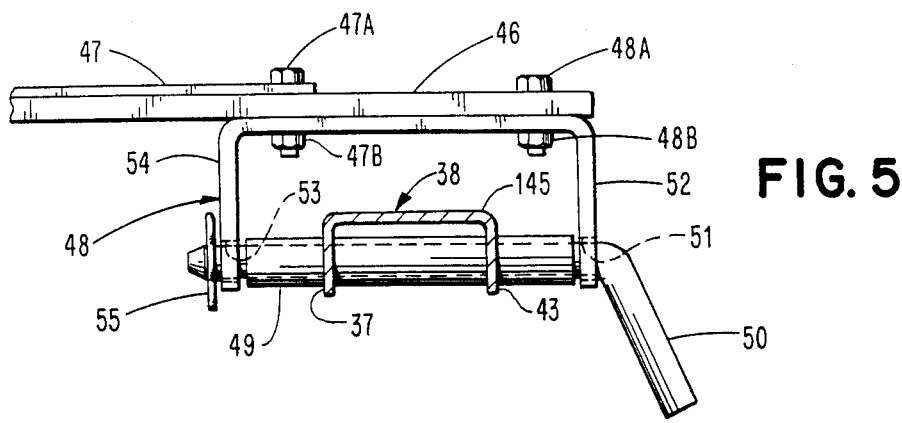
FIG. 5 is a fragmentary rear elevational view, partly in section, showing the connection of a tow bar of the cart and a hitch bar of the riding lawn mower.

The tow bar 38 has its forward end attached to a hitch bar 46 (see FIG. 5) of the riding lawn mower 11 (see FIG. 1). The hitch bar 46 (see FIG. 5) extends laterally from a hitch plate 47, which is mounted on the rear of the riding lawn mower 11 (see FIG. 1), and is secured thereto by suitable means such as bolts 47A (see FIG. 5) and nuts 47B, for example. The hitch bar 46 has a U-shaped clevis 48 secured thereto by bolts 48A and nuts 48B, for example, in addition to the bolts 47A and the nuts 47B and extending downwardly therefrom. It should be understood that the clevis 48 could extend upwardly from the hitch bar 46 if the hitch plate 47 were mounted lower on the riding lawn mower 11 (see FIG. 1).

The tow bar 38 (see FIG. 5) has a hollow tube 49 secured to the side walls 37 and 43 and extending therefrom to receive a pin 50, which extends through an opening 51 in a side wall 52 of the clevis 48, the hollow tube 49, and an opening 53 in a side wall 54 of the clevis 48. A cotter pin 55 retains the pin 50 in position so as to connect the tow bar 38 to the hitch bar 46 whereby the collector cart 10 (see FIG. 1) can be towed or pulled by the riding lawn mower 11.

The connection between the tow bar 38 (see FIG. 5) and the hitch bar 46 allows relative movement therebetween about the horizontal axis of the pin 50 extending through the hollow tube 49 for the unevenness of the ground. The slight spacing of the ends of the hollow tube 49 from the side walls 52 and 54 of the clevis 48 enables a very limited pivoting about a vertical axis between the tow bar 38 and the hitch bar 46.

The collector cart 10 (see FIG. 1) also includes a canopy 56 mounted for both sliding and pivotal movement with respect to the body 12 and enclosing the open top of the body 12 and closing the open rear end 20 (see FIG. 4) of the body 12. The canopy 56 (see FIG. 3) includes a frame 57 and a cover material 58 supported by the frame 57.

The frame 57 includes a front upper frame 59, which is U-shaped, pivotally connected to the front ends of a pair of side tubes 60 and 61. A rod 62 extends through aligned openings 63 (see FIG. 10) in the side tube 60, aligned openings (not shown) in a substantially vertical leg 65 (see FIG. 3) of the front upper frame 59, aligned openings (not shown) in a substantially vertical leg 67 of the front upper frame 59, and aligned openings (not shown) in the side tube 61.

The rear end of the side tube 60 has a leg 69 of a rear upper frame 70, which is U-shaped, pivotally connected thereto through a bolt 71 and a nut 72 (see FIG. 4). The side tube 61 is similarly connected to a leg 73 of the rear upper frame 70.

A rear bottom frame 74, which is U-shaped, is secured to the rear upper frame 70 by bolts 75 and nuts 76 (see FIG. 3). The bolts 75 attach an overlying portion of a leg 77 (see FIG. 4) of the rear bottom frame 74 to the leg 69 of the rear upper frame 70 and an overlying portion of a leg 78 of the rear bottom frame 74 to the leg 73 of the rear upper frame 70.

The cover material 58 (see FIG. 3) includes a main central portion 79 of a flexible woven material such as a woven polyester, for example. The main central portion 79 of the cover material 58 is attached to a front portion 80 (see FIG. 14) by seam stitches 81.

Each side of the main central portion 79 (see FIG. 3) has a triangular shaped mesh piece 82 such as a woven polyester with an open weave, for example, attached to it by stitches 83 (see FIG. 13). The bottom end of each of the mesh pieces 82 on opposite sides of the main central portion 79 has a bottom portion 84 of the same material as the main central portion 79 secured thereto by stitches 85. Thus, each of the mesh pieces 82 has a lower part of the main central portion 79 overlying it to allow air to blow out from the interior of the canopy 56 (see FIG. 3). The vertical portion of each of the mesh pieces 82 is attached to a portion 85' of the front portion 80 of the cover material by stitching (not shown).

By forming the mesh pieces 82 of a substantially triangular shape, the air is blown away from the operator of the riding lawn mower 11 (see FIG. 1). Additionally, since the rear of the canopy 56 is filled initially because of the debris being supplied to its front, it is desired for the larger area of the triangular shaped mesh pieces 82 to be adjacent the front of the canopy 56.

Each of the bottom portions 84 (see FIG. 3) of the cover material 58 has a looped portion 86 (see FIG. 15) extending around the side tube 60. Stitches 87 retain the looped portion 86 attached to the bottom portion 84 of the cover material 58. A similar arrangement exists for the side tube 61 (see FIG. 3).

As shown in FIG. 16, the front portion 80 of the cover material 58 has its lower end looped around the inside portion of the rod 62. A piece 88 of a semi-rigid material such as polyethylene, for example, is attached by stitches 89 to the lower end of the front portion 80 of the cover material 58 to enclose the outer portion of the rod 62. The piece 88 of polyethylene extends downwardly within the interior of the front wall 16 (see FIG. 2) of the body 12. The piece 88 (see FIG. 3) of polyethylene is preferably about 0.040" thick. The piece 88 of polyethylene preferably has a total length of about four inches and a width of about forty-two inches.

The rear upper frame 70 and the rear bottom frame 74 have an end closure 90 supported thereby to close the open rear end 20 (see FIG. 4) of the body 12 when the canopy 56 is in its closed position. The end closure 90 may be formed of any suitable semi-rigid material such as polyethylene, for example. When the end closure 90 is formed of polyethylene, the polyethylene preferably has a thickness of 0.040".

The end closure 90 is attached to the main central portion 79 (see FIG. 3) of the cover material 58 and the adjacent portion of the bottom portion 84 of the cover material 58. As shown in FIG. 17, the end closure 90 is attached to the bottom portion 84 of the cover material 58 by stitches 91. The end closure 90 is similarly attached to the main central portion 79 (see FIG. 3) of the cover material 58 where the bottom portions 84 of the cover material 58 are not present.

The end closure 90 (see FIG. 4) also is attached to each of the legs 77 and 78 of the rear bottom frame 74 and to a horizontal tube 92 of the rear bottom frame 74 by metal cutting screws. Thus, the end closure 90 is rigidly positioned.

The front upper frame 59 (see FIG. 3) is held in its elevated or raised position by spring rods 96. One of the spring rods 96 extends between the leg 65 of the front upper frame 59 and the side tube 60, and another of the spring rods 96 extends between the leg 67 of the front upper frame tube 59 and the side tube 61.

Figure 12:
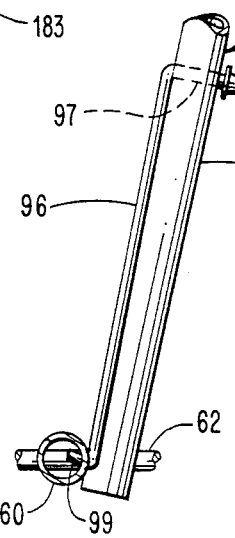
FIG. 12 is an end elevational view, partly in section, of a portion of the canopy frame with the cover material removed and showing the connection of a spring rod between a front upper frame of the canopy frame and a side tube of the canopy frame and taken along line 12—12 of FIG. 3.

As shown in FIG. 12, the spring rod 96 has a bent end 97 extending through aligned openings in the leg 65 with a push nut 98 on its end to retain the spring rod 96 connected to the leg 65. The spring rod 96 has its other bent end 99 removably disposed within an opening in the side tube 60. Accordingly, when the end 99 of the spring rod 96 is withdrawn from the opening in the side tube 60 and another of the spring rods 96 is withdrawn from the opening in the side tube 61 (see FIG. 3), the front upper frame 59 can be pivoted about the substantially horizontal rod 62.

The rear upper frame 70 has spring rods 100 similarly connected between the leg 69 and the side tube 60 and between the leg 73 and the side tube 61. To collapse the rear upper frame 70, the spring rods 100 are withdrawn from the side tubes 60 and 61 and the rear upper frame 70, which has the rear lower frame 74 fixed thereto, is pivoted about the bolts 71 and the nuts 72 (see FIG. 4) whereby the canopy 56 may be collapsed.

Figure 10:
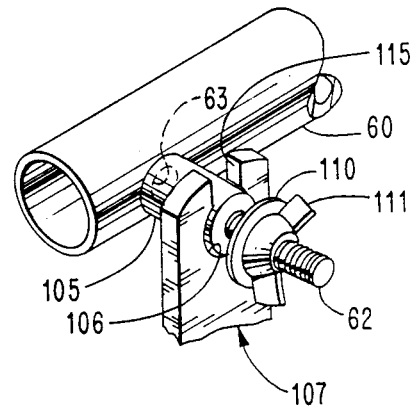
FIG. 10 is an enlarged fragmentary perspective view of the connection of a portion of the canopy frame to a linkage mechanism with a retaining washer and a wing nut not in their spacer retaining position.

As shown in FIG. 10, one end of the rod 62 has a spacer 105 fitting thereover and disposed within an enlarged opening 106 of an upper shift arm 107, which is pivotally mounted on the side wall 18 (see FIG. 2) of the body 12 by a bolt 108 and a pair of nuts 109 on opposite sides of the upper shift arm 107. The spacer 105 (see FIG. 10) is held against the side tube 60 by a washer 110 and a wing nut 111 when the wing nut 111 is tightened. The other end of the rod 62 is similarly mounted in an upper shift arm 112 (see FIG. 2), which is pivotally mounted on the side wall 19 of the body 12 by a bolt 113 and a pair of nuts 114 on opposite sides of the upper shift arm 112.

Accordingly, any motion of the upper shift arms 107 and 112 is transmitted to the rod 62 (see FIG. 3). When it is desired to disconnect the canopy 56 so that it may be removed from connection to the upper shift arms 107 (see FIG. 2) and 112, the wing nut 111 (see FIG. 10) is loosened so that the upper shift arm 107 may be moved outwardly whereby the spacer 105 is removed from the enlarged opening 106 in the upper shift arm 107 to permit withdrawal of the rod 62 through a reduced slot 115 communicating with the enlarged opening 106 in the upper shift arm 107. A similar operation occurs with the upper shift arm 112 (see FIG. 2).

The upper shift arm 107 is pivotally connected to a link 120 through a bolt 121 and a nut 122. The link 120 has its lower end pivotally connected to an upper end of a substantially vertical portion 123 of a linkage arm 124 by a bolt 125 and a nut 126.

The linkage arm 124 includes a first substantially horizontal portion 127 having its end welded to a second substantially horizontal portion 128 of the linkage arm 124. The first substantially horizontal portion 127 of the linkage arm 124 is pivotally supported by a bracket 129, which is fixed to the bottom wall 17 of the body 12 by bolts 129A and nuts 129B. The second substantially horizontal portion 128 of the linkage arm 124 is pivotally supported by a bracket 130, which is fixed to the bottom wall 17 of the body 12 by bolts 130A and nuts 130B.

The linkage arm 124 has the upper end of a substantially vertical portion 131, which extends upwardly from the second substantially horizontal portion 128, pivotally connected to a lower end of a link 132 in the same manner as the upper end of the substantially vertical portion 123 of the linkage arm 124 is pivotally connected to the link 120. The link 132 has its upper end pivotally connected to the lower end of the upper shift arm 112 in the same manner as the upper end of the link 120 is pivotally connected to the lower end of the upper shift arm 107.

The first substantially horizontal portion 127 of the linkage arm 124 has a lift handle 133 fixed thereto by welding, for example, so that an operator of the riding lawn mower 11 (see FIG. 1) may grasp the lift handle 133 (see FIG. 2) to cause rotation of the horizontal portions 127 and 128 of the linkage arm 124 when it is desired to dump the debris collected within the collector cart 10. The second substantially horizontal portion 128 of the linkage arm 124 has a lift handle 134 fixed thereto by welding, for example, for the same purpose as the lift handle 133. Only one of the lift handles 133 and 134 is positioned for grasping by the operator of the riding lawn mower 11 (see FIG. 1) depending on the position of the collector cart 10 with respect to the riding lawn mower 11.

The body 12 of the collector cart 10 is retained in its non-dumping or tow position through being locked to the tow bar 38 to prevent relative pivoting therebetween about the dump pivot bars 24 (see FIG. 6) and 25. The tow bar 38 (see FIG. 19) has a pivotally mounted lock handle 135 cooperating with a lock bracket 136, which is fixed to the bottom wall 17 (see FIG. 2) of the body 12 by the bolts 129A and the nuts 129B and the bolts 130A and the nuts 130B. The lock bracket 136 has a slot 137 in its horizontal bottom portion 138 to receive the lock handle 135 (see FIG. 19). The lock handle 135 has a slot 139 to receive the horizontal bottom portion 138 of the lock bracket 136.

Figure 11:
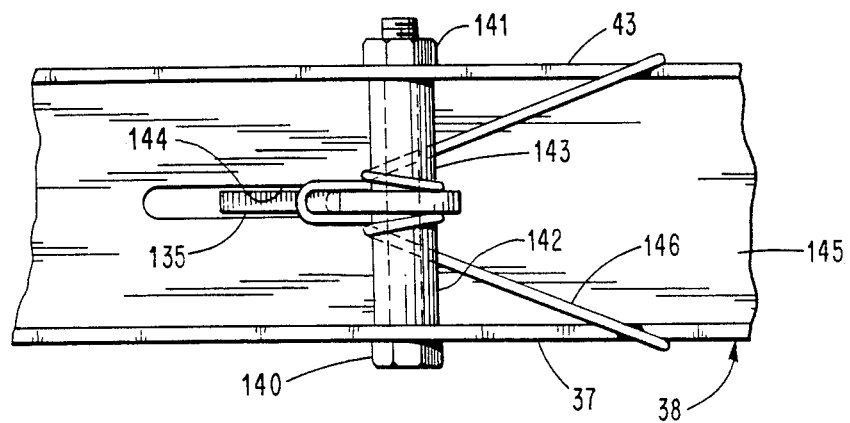
FIG. 11 is a bottom plan view of a portion of the tow bar and showing the pivotal mounting of a locking handle utilized to lock the body of the cart to the tow bar to prevent pivoting of the body and taken along line 11—11 of FIG. 19.

The lock handle 135 is pivotally mounted on a bolt 140, which extends between the side walls 37 (see FIG. 11) and 43 of the tow bar 38 and is held in position by a nut 141. Spacers 142 and 143 surround the bolt 140 and extend from the lock handle 135 to the side walls 37 and 43, respectively, of the tow bar 38.

The tow bar 38 has a longitudinal slot 144 in its top wall 145 to receive a portion of the lock handle 135 to enable the lock handle 135 to pivot relative to the tow bar 38 about the axis of the bolt 140. A torsion spring 146 continuously urges the lock handle 135 to the position in which the slot 139 (see FIG. 19) in the lock handle 135 receives the horizontal bottom portion 138 of the lock bracket 136 to lock the body 12 to the tow bar 38 so that the body 12 is maintained in its non-dumping or tow position.

When the body 12 is in its non-dumping or tow position, the canopy 56 (see FIG. 3) has its rear end locked to the rear end of the body 12 (see FIG. 4). The rear bottom frame 74 of the frame 57 of the canopy 56 has a rear latch lock 147 secured to its bottom horizontal tube 92 by screws 149. The rear latch lock 147 (see FIG. 18) has a portion 150 extending below a bottom rear flange 151 of the body 12. Thus, the canopy 56 is locked to the body 12 at its rear end so that it cannot be raised by lifting on the rear of the canopy 56.

Figure 8:
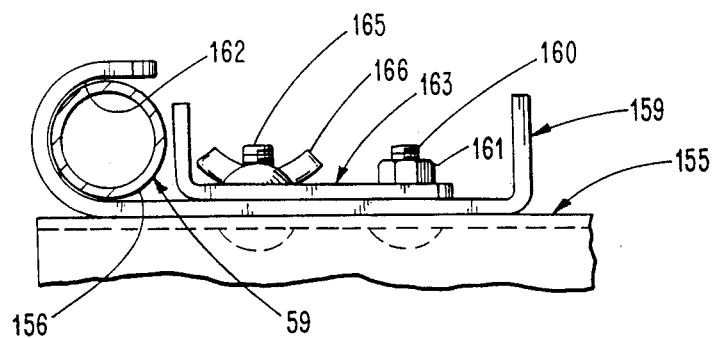
FIG. 8 is a fragmentary elevational view, partly in section, of a portion of the canopy frame and showing its connection to a chute transporting debris to the interior of the canopy.

With the canopy 56 resting on top of the body 12 and locked thereto by the rear latch lock 147, the debris picked up by the riding lawn mower 11 (see FIG. 1) is supplied from an outlet 152 in a deck 153 of the riding lawn mower 11 through a chute 154. The chute 154 has a telescoping arrangement with a second and larger chute 155, which has its upper end connected to an upper horizontal tube 156 (see FIG. 8) of the front upper frame 59.

The upper end of the second chute 155 extends into an opening or port 157 (see FIG. 3) in a portion 158, which is formed of Neoprene, for example, having a thickness of 0.060", for example, sewn to the front portion 80 of the cover material 58 of the canopy 56 by a double stitch. The second chute 155 (see FIG. 8) has a strap tube connector 159 secured thereto by a bolt 160 and a nut 161. The strap tube connector 159 has an arcuate or curved end 162 fitting around the horizontal tube 156 of the front upper frame 59.

Figure 9:
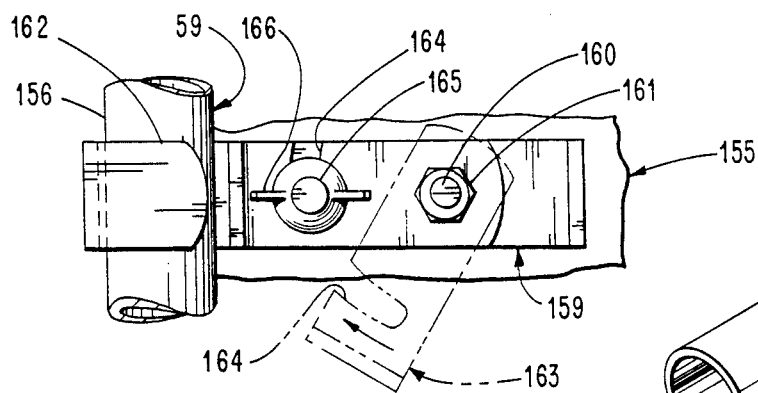
FIG. 9 is a fragmentary top plan view of a portion of FIG. 8 and showing the connection of the chute to the canopy frame.

An L-shaped clip tube lock 163 is pivotally mounted on the bolt 160 and moves between its phantom line position of FIG. 9 and its solid line position of FIG. 9 in which it cooperates with the arcuate or curved end 162 of the strap tube connector 159 to retain the chute 155 connected to the horizontal tube 156 of the front upper frame 59. The clip tube lock 163 has a slot 164 to receive a bolt 165, which extends from the second chute 155 through the strap tube connector 159 and has a wing nut 166 cooperating therewith. Thus, when the clip tube lock 163 is moved to its chute retaining position, the slot 164 receives the bolt 165 and the wing nut 166 is tightened to retain the clip tube lock 163 in its chute retaining position.

As shown in FIG. 3, the front portion 80 of the cover material 58 of the canopy 56 has an opening covered by a transparent material 167 such as Plexiglas, for example. This allows the interior of the canopy 56 to be viewed.

Figure 2:
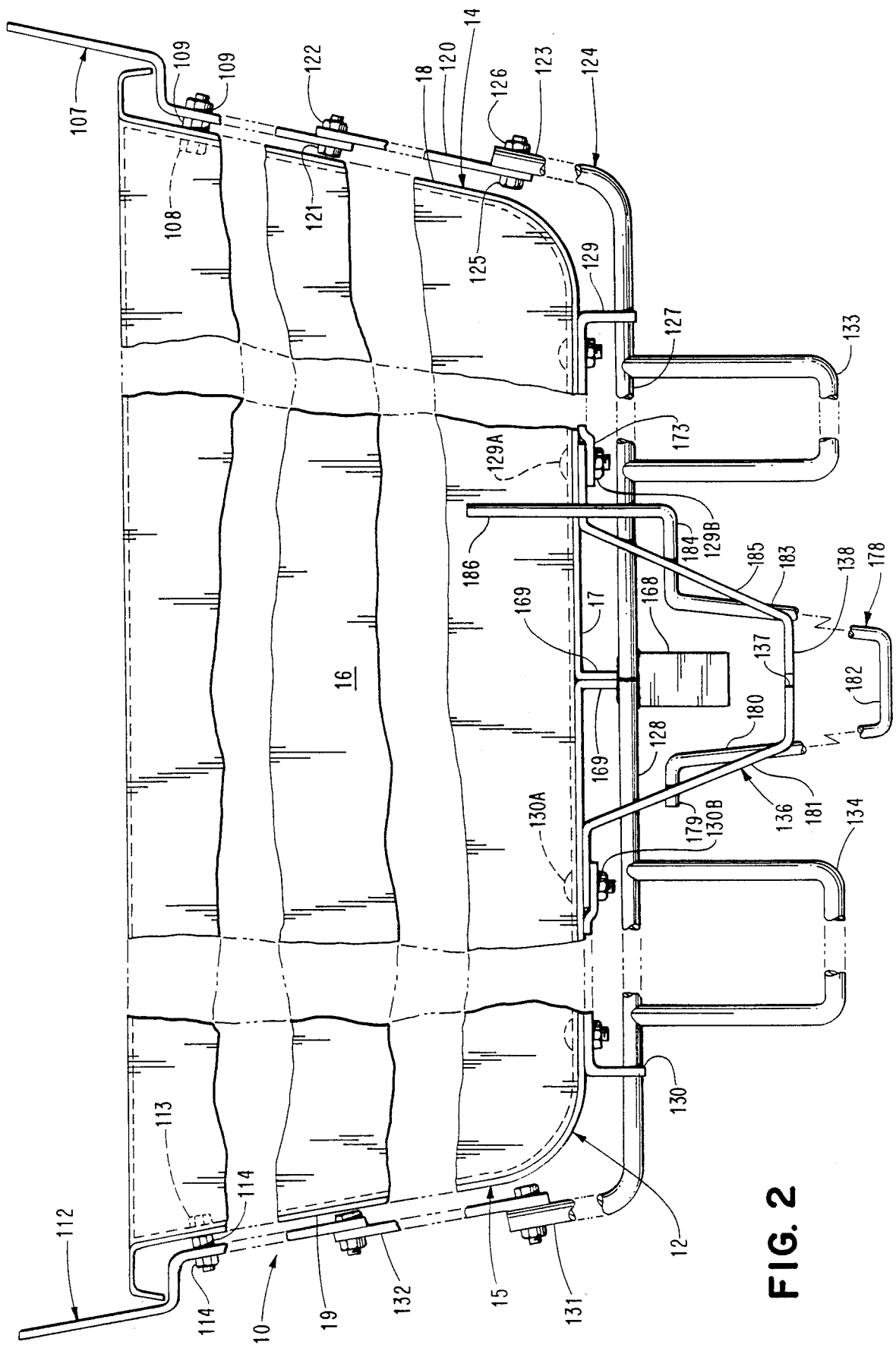
FIG. 2 is a front elevational view of a body of the cart of FIG. 1.

When the canopy 56 is in its closed position in which the rear latch lock 147 (see FIG. 18) has the portion 150 disposed beneath the bottom rear flange 151 of the body 12, the linkage mechanism is in the solid line position of FIG. 18. In this position, an unlock lever 168, which is welded to the substantially horizontal portions 127 and 128 (see FIG. 2) of the linkage arm 124 as shown in FIG. 2 in a predetermined relation to the lift handles 133 and 134, engages the front edges of bottom flanges 169 (see FIG. 18) of the body 12. In this position, there is an overcenter relation between the link 120 and the substantially vertical portion 123 of the linkage arm 124 (There is a similar relation between the link 132 (see FIG. 2) and the substantially vertical portion 131 of the linkage arm 124) at the pivotal connection therebetween. This prevents any movement of the upper shift arms 107 and 112.

When it is desired to dump the debris thrown into the collector cart 10 from the riding lawn mower 11 (see FIG. 1) through the chutes 154 and 155, the operator drives the riding lawn mower 11 to the area in which the material within the collector cart 10 is to be dumped. This usually necessitates backing of the riding lawn mower 11. The caster wheels 29 (see FIG. 6) and 32 enable backing of the collector cart 10 without any jackknifing of the collector cart 10. This also eliminates the necessity for maneuvering the riding lawn mower 11 (see FIG. 1).

When the collector cart 10 is ready to have the material therein dumped therefrom, the operator remains on the riding lawn mower 11 and pulls upwardly on the lift handle 133 (see FIG. 18), for example, to cause clockwise (as viewed in FIG. 18) pivoting of the lift handle 133. This clockwise pivoting of the lift handle 133 causes the linkage to be removed from its overcenter position whereby the upper end of the link 120 moves upwardly to the phantom line position of FIG. 18 to cause the upper shift arm 107 to pivot slightly counterclockwise so that the left end of the upper shift arm 107 shifts slightly to the left about one-quarter of an inch. Since the rod 62 (see FIG. 3) is attached to the upper ends of the upper shift arm 107 (see FIG. 2) and the upper shift arm 112, this causes the canopy 56 (see FIG. 18) to move longitudinally relative to the body 12 in a forward direction as indicated by an arrow 170 to the phantom line position. This shifts the rear latch lock 150 from the solid line position of FIG. 18 to the phantom line position as shown by an arrow 171. As shown in the phantom line position, the unlock lever 168 is no longer engaging the bottom flanges 169 of the body 12.

Continued clockwise pivoting of the lift handle 133 by pulling upwardly on it causes the upper end of the link 120 to be pulled downwardly to the solid line position in FIG. 19 whereby the upper shift arm 107 pivots clockwise. This clockwise pivoting of the upper shift arm 107 moves its upper end rearwardly. This causes the rod 62 of the canopy 56 to move rearwardly so that the canopy 56 moves rearwardly relative to the body 12 as indicated by an arrow 172.

When the lift handle 133 is in the solid line position of FIG. 19, the unlock lever 168 is engaging the lock handle 135 to begin to exert a force on the lock handle 135 to move it against the force of the torsion spring 146 whereby the lock handle 135 and the lock bracket 136 would no longer be locked to each other so that the body 12 will be unlocked from the tow bar 38. At this time, the portion 150 of the rear latch lock 147 is still overlying the bottom rear flange 151 of the body 12 so that pivoting of the canopy 56 relative to the body 12 cannot occur.

Continued lifting of the handle 133 to cause it to continue to pivot clockwise results in the upper end of the link 120 being moved further downwardly to produce further clockwise pivoting of the upper shift arm 107 to the phantom line position of FIG. 19. This causes the portion 150 of the rear latch lock 147 to be moved sufficiently rearward of the bottom rear flange 151 of the body 12 so that pivoting of the canopy 56 relative to the body 12 may occur. This total motion of the canopy 56 rearwardly relative to the body 12 is approximately two inches from the start position (solid line position of FIG. 18).

The rearward shifting of the canopy 56 relative to the body 12 releases the debris that has bulged against the cover material 58 (see FIG. 3) of the canopy 56 and against the end enclosure 90 (see FIG. 4) during filling. This eliminates a resistance to the normal lifting forces to move the canopy 56 (see FIG. 19) away from the body 12.

During filling of the interior of the body 12 and the canopy 56, the up and down motion of the collector cart 10 during its travel across the ground tends to pack the debris. This debris is initially packed against the end closure 90 (see FIG. 4) and then against the sides of the cover material 58 (see FIG. 3) of the canopy 56. The rearward shifting of the canopy 56 relative to the body 12 moves the end closure 90 (see FIG. 4) away from the packed debris completely and moves the sides of the cover material 58 (see FIG. 3) of the canopy 56 relative to the debris so that the debris is no longer tightly packed thereagainst.

In the phantom line position of FIG. 19, the unlock lever 168 is about to completely remove the lock handle 135 from the lock bracket 136. When the bottom portion 138 of the lock bracket 136 is no longer received within the slot 139 in the lock handle 135, the body 12 will no longer be locked to the tow bar 38.

As the lift handle 133 is continued to be lifted so that it pivots clockwise, the lift handle 133 engages a portion 173 (see FIG. 20) of the bracket 129, which is fixed to the body 12. With the body 12 no longer locked to the tow bar 38 (see FIG. 1), continued lifting of the lift handle 133 (see FIG. 20) causes the body 12 to pivot about the horizontal axis of the dump pivot bars 24 (see FIG. 6) and 25.

As the body 12 (see FIG. 1) begins to pivot, the canopy 56 is restrained from following this pivotal motion. This is because a rope 174 of a fixed length has one end attached to the deck 153 of the riding lawn mower 11 by a spring hook 175 such as used for connecting a dog leash to a dog collar. It should be understood that the one end of the rope 174 may be secured to other portions of the riding lawn mower 11.

The other end of the rope 174 is attached by an S-hook 176 to the upper horizontal tube 156 (see FIG. 3) of the front upper frame 59. There is an opening 177 in the main central portion 79 and the front portion 80 of the cover material 58 of the canopy 56 to receive the S-hook 176 (see FIG. 1).

Therefore, as the front end of the body 12 pivots upwardly to the phantom line position of FIG. 1, the rope 174 causes the canopy 56 to begin to pivot about the horizontal axis of the rod 62. Thus, there is a clam shell relation between the body 12 and the canopy 56 as shown in phantom in FIG. 1. When the body 12 reaches its dumping position, the canopy 56 is completely raised therefrom as shown in phantom in FIG. 1.

Accordingly, the angle of the bottom wall 17 (see FIG. 2) of the body 12 and the relation of the canopy 56 (see FIG. 1) to the body 12 is such that all debris collected within the collector cart 10 is dumped therefrom. The open rear end 20 (see FIG. 4) in the body 12 allows all debris within the body 12 to fall therefrom. As shown in phantom in FIG. 1, the angle of the canopy 56 is such that any material remaining therein will fall by gravity into the body 12.

The body 12 will remain in the phantom line position of FIG. 1 when the lift handle 133 (see FIG. 2) is released with the body 12 having grass clippings, for example, therein. However, it has been found that the body 12 will not remain in this position when it has a lighter density material such as thatch or leaves, for example, therein without the lift handle 133 (see FIG. 2) being held by the operator.

To avoid the operator having to hold the lift handle 133 throughout the dumping of the debris from the collector cart 10, a dump lock rod 178, which is a wire having a diameter of 5/16" to ⅜", is pivotally supported by the lock bracket 136. The dump lock rod 178 includes an end portion 179, which extends from one end of a first leg 180 of the dump lock rod 178, pivotally supported in a first leg 181 of the lock bracket 136. The leg 180 is connected to one end of a base 182 having a second leg 183 extending from its other end. The second leg 183 has a portion 184, which is in alignment with the end portion 179, at its end for pivotal support by a second leg 185 of the lock bracket 136. The dump lock rod 178 includes a handle portion 186 extending from the portion 184.

When the body 12 is in the towed or pulled position (solid line position of FIG. 1), the base 182 (see FIG. 2) of the dump lock rod 178 rests on the tow bar (see FIG. 1). As the body 12 is raised to its dumping position (phantom line position), the base 182 (see FIG. 2) moves along the tow bar 38 (see FIG. 1) by the dump lock rod 178 pivoting about the aligned portions 179 (see FIG. 2) and 184.

When the body 12 is in its dumping position (phantom line position of FIG. 1), the legs 180 and 183 (see FIG. 2) of the dump lock rod 178 are slightly rearward of the vertical. The friction between the dump lock rod 178 and the tow bar 38 (see FIG. 1) is such that the dump lock rod 178 will hold the body 12 in its dumping position. This enables the operator to release the lift handle 133 (see FIG. 2) so that the operator can use both hands to operate the riding lawn mower 11 (see FIG. 1) in a forward motion to cause debris within the body 12 to slide therefrom.

After all of the debris has been dumped from the body 12, the operator can lift the lift handle 133 to raise the body 12 slightly so that the operator can manually urge the handle portion 186 of the dump lock rod 178 downwardly to remove the base 182 (see FIG. 2) of the dump lock rod 178 from engagement with the tow bar 38 (see FIG. 1) so that the dump lock rod 178 will return to the solid line position of FIG. 1 when the body 12 is lowered to the solid line position of FIG. 1.

When dumping of the debris from the collector cart 10 has been completed, the lift handle 133 (see FIG. 2) is pushed downwardly by the operator of the riding lawn mower 11 (see FIG. until the canopy 56 is locked to the body 12 and the linkage mechanism is in its over-center (solid line) position of FIG. 18. This is when the unlock lever 168 is engaging the bottom flanges 169 of the body 12 as shown in FIG. 18.

When the front upper frame 59 (see FIG. 3) is pivoted to its collapsed position and the rear upper frame 70 is similarly pivoted to its collapsed position, they will not engage each other. By removing the connection of the second chute 155 (see FIG. 8) to the upper horizontal tube 156 of the front upper frame 59 by releasing the wing nut 166 and rotating the clip tube lock 163 and then disconnecting the rod 62 (see FIG. 3) from the upper shift arms 107 (see FIG. 2) and 112, the canopy 56 (see FIG. 1) can be removed from its mounting on the body 12 and stored in its collapsed condition, which requires a very small volume for storage.

It should be understood that it is not a requisite that the linkage mechanism be connected to opposite sides of the canopy 56. One linkage mechanism could be employed rather than two linkage mechanisms on opposite sides of the canopy 56. However, the single linkage mechanism should be preferably connected along the centerline of the canopy 56. This arrangement would decrease the total volume of the body 12 because of the need for a fake front wall rearwardly of the front wall 16 (see FIG. 2).

It also should be understood that the collector cart 10 (see FIG. 1) may be employed as a utility cart. This is accomplished by removing the canopy 56 and installing a tail gate (not shown) such as shown in the aforesaid Doering patent to close the open rear end 20 (see FIG. 4) of the body 12.

An advantage of this invention is that an operator of a riding lawn mower does not have to get off of it to dump the contents of a collector cart being towed or pulled by the riding lawn mower. Another advantage of this invention is that there is automatic unlocking of the canopy of the collector cart from the body of the collector cart when dumping is to occur. A further advantage of this invention is that all of the debris within the collector cart is removed without any requirement for manual removal. Still another advantage of this invention is that it is easy to back up the collector cart to a dumping area. A still further advantage of this invention is that the canopy may be easily removed therefrom. Yet another advantage of this invention is that the canopy of the collector cart may be collapsed to a very small volume for storage.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A collector cart for towing by pulling means including:
   a body having a bottom wall, side walls, a front wall, and an open rear end;
   wheel means;
   body mounting means for mounting said body for pivotal movement relative to said wheel means and for support thereby;
   a canopy including:
   a frame;
   and a cover mounted on said frame;
   frame mounting means to mount said frame on said body for both longitudinal and pivotal movement of said canopy between a closed position and a dumping position;
   said cover of said canopy having means to receive debris into its interior and the interior of said body when said canopy is mounted on said body;
   said frame including means to close said open rear end of said body when said canopy is in its closed position when mounted on said body;
   actuating means to cause longitudinal shifting of said frame relative to said body prior to causing pivoting of said body relative to said wheel means;
   and first causing means for causing pivoting of said frame relative to said body during pivoting of said body relative to said wheel means by said actuating means.

2. The collector cart according to claim 1 in which said actuating means includes means to cause pivoting of said body relative to said wheel means after longitudinal shifting of said frame by said actuating means is completed.

3. The collector cart according to claim 2 including:
   connecting means extending forwardly of said body for connection to the pulling means, said connecting means being connected to said body mounting means;
   releasably connecting means for releasably connecting said body to said connecting means to prevent pivoting of said body relative to said wheel means;
   and said actuating means including disconnect means for actuating said releasably connecting means to disconnect said body from said connecting means to allow pivoting of said body relative to said wheel means.

4. The collector cart according to claim 3 in which said frame mounting means includes frame pivotal mounting means to pivotally mount said frame on said body adjacent the front end of each.

5. The collector cart according to claim 4 in which said frame pivotal mounting means includes:
   an arm having one end pivotally connected to said frame adjacent its front end;
   arm pivotal mounting means for pivotally mounting said arm intermediate its ends on said body adjacent its front end;
   and said arm having its outer end movable by said actuating means to shift said frame longitudinally in a rearward direction relative to said body when said actuating means is moved.

6. The collector cart according to claim 5 including:
   locking means for locking the rear of said frame to said body;
   and said locking means being released by longitudinal movement of said frame in a rearward direction relative to said body by said actuating means.

7. The collector cart according to claim 6 in which said actuating means includes:
   a first link having one end pivotally connected to the other end of said arm of said frame pivotal mounting means;
   and linkage means pivotally supported by said body and pivotally connected to the other end of said first link;
   and said linkage means of said actuating means includes:
   engaging means for engaging said body to cause pivoting of said body relative to said wheel means;
   and said disconnect means for actuating said releasably connecting means to disconnect said body from said connecting means.

8. The collector cart according to claim 7 including said first causing means including means attached to said frame to cause pivoting of said frame relative to said body during pivoting of said body relative to said wheel means by said engaging means of said linkage means of said actuating means.

9. The collector cart according to claim 7 in which said linkage means of said actuating means includes:
   a first portion pivotally supported by said body, said first portion having said engaging means and said disconnect means fixed thereto in a predetermined angular relation;
   and a second portion pivotally connected to the other end of said first link.

10. The collector cart according to claim 6 in which said disconnect means actuates said releasably connecting means no earlier than when said locking means is released.

11. The collector cart according to claim 4 in which said frame pivotal mounting means includes:
    a pair of arms, each of said arms having one end pivotally connected to said frame adjacent its front end on opposite sides of said frame;
    first arm pivotal mounting means for pivotally mounting one of said arms intermediate its ends on one of said side walls of said body adjacent its front end;
    second arm pivotal mounting means for pivotally mounting the other of said arms intermediate its ends on the other of said side walls of said body adjacent its front end;
    and each of said arms having its other end simultaneously movable by said actuating means to shift said frame longitudinally in a rearward direction relative to said body when said actuating means is moved.

12. The collector cart according to claim 11 including:
    locking means for locking the rear of said frame to said body;

and said locking means being released by longitudinal movement of said frame in a rearward direction relative to said body by said actuating means.

13. The collector cart according to claim 12 in which said actuating means includes:
   a pair of first links disposed on opposite sides of said body;
   one of said first links having one end pivotally connected to the other end of said one arm of said frame pivotal mounting means and the other of said first links having one end pivotally connected to the other end of said other arm of said frame pivotal mounting means; linkage means pivotally supported by said body; and each of said first links having its other end pivotally connected to said linkage means.

14. The collector cart according to claim 13 in which said linkage means of said actuating means includes:
   a substantially horizontal portion pivotally supported beneath said bottom wall of said body;
   first and second substantially vertical portions extending upwardly from said substantially horizontal portion adjacent each of said side walls of said body;
   one of said first and second substantially vertical portions being pivotally connected to the other end of one of said first links;
   and the other of said first and second substantially vertical portions being pivotally connected to the other end of the other of said first links.

15. The collector cart according to claim 14 including:
   engaging means fixed to said substantially horizontal portion of said linkage means of said actuating means for engaging said body to cause pivoting of said body relative to said wheel means during pivoting of said substantially horizontal portion;
   and said disconnect means being fixed to said substantially horizontal portion of said linkage means of said actuating means in a predetermined angular relation to said engaging means for actuating said releasably connecting means to disconnect said body from said connecting means during pivoting of said substantially horizontal portion.

16. The collector cart according to claim 1 including:
   connecting means connected to said body mounting means and extending forwardly of said body for connection to the pulling means;
   releasably connecting means for releasably connecting said body to said connecting means to prevent pivoting of said body relative to said wheel means;
   and said actuating means including disconnect means for actuating said releasably connecting means to disconnect said body from said connecting means to allow pivoting of said body relative to said wheel means.

17. The collector cart according to claim 1 including:
   locking means for locking the rear of said frame to said body;
   and said actuating means including means for unlocking said locking means and for causing pivoting of said body relative to said wheel means to move said body to its dumping position after unlocking said locking means.

18. The collector cart according to claim 1 including body support means supported solely by said body for supporting said body in its dumping position when said body is pivoted to its dumping position by said actuating means pivoting said body relative to said wheel means.

19. A collector cart for towing by pulling means including:
   a body having a bottom wall, side walls, a front wall, and an open rear end;
   wheel means;
   body mounting means for mounting said body for pivotal movement relative to said wheel means and for support thereby;
   a canopy including:
   a frame;
   and cover mounted on said frame;
   frame mounting means to mount said frame on said body for pivotal movement of said canopy relative to said body between a closed position and a dumping position;
   said cover of said canopy having means to receive debris into its interior and the interior of said body when said canopy is mounted on said body;
   said frame including closing means for closing said open rear end of said body when said canopy is in its closed position when mounted on said body;
   locking means for locking said frame to said body when said canopy is in its closed position when mounted on said body;
   actuating means for causing release of said locking means to unlock said frame form said body prior to causing pivoting of said body relative to said wheel means;
   and causing means for causing pivoting of said frame relative to said body during pivoting of said body relative to said wheel means by said actuating means.

20. The collector cart according to claim 19 including:
   connecting means connected to said body mounting means and extending forwardly of said body for connection to the pulling means;
   releasably connecting means for releasably connecting said body to said connecting means to prevent pivoting of said body relative to said wheel means;
   and said actuating means including disconnect means for actuating said releasably connecting means to disconnect said body from said connecting means to allow pivoting of said body relative to said wheel means.

21. The collector cart according to claim 20 in which said actuating means includes means for causing said disconnect means of said actuating means to be effective only after said locking means is rendered ineffective.

22. The collector cart according to claim 19 including:
   connecting means connected to said body mounting means and extending forwardly of said body for connection to the pulling means;
   releasably connecting means for releasably connecting said body to said connecting means to prevent pivoting of said body relative to said wheel means;
   and said actuating means including:
      means pivotally connected to said frame for causing release of said locking means to unlock said frame from said body;
      and cooperating means for cooperating with said releasably connecting means for actuating said releasably connecting means to disconnect said body from said connecting means to allow pivoting of said body relative to said wheel means.

23. The collector cart according to claim 19 in which said causing means includes means attached to said frame and adapted to be attached to the pulling means for causing pivoting of said frame relative to said body during pivoting of said body relative to said wheel means by said actuating means.

* * * * *

UNITED STATES PATENT AND TRADEMARK OFFICE
CERTIFICATE OF CORRECTION

PATENT NO. : 4,836,610

DATED : June 6, 1989

INVENTOR(S) : Charles W. Doering et al

It is certified that error appears in the above-identified patent and that said Letters Patent is hereby corrected as shown below:

Column 5, line 4, "oar" should read -- bar --.

Column 6, line 68, cancel "tube" (first occurrence).

Column 9, line 42, "124)" should read -- 124.) --.

Column 12, line 24, "FIG." should read -- FIG. 1) --.

Column 13, lines 21-23 should read:

-- a canopy including:

a frame;

and a cover mounted on said frame; --.

UNITED STATES PATENT AND TRADEMARK OFFICE
CERTIFICATE OF CORRECTION

PATENT NO. : 4,836,610

DATED : June 6, 1989

INVENTOR(S) : Charles W. Doering et al

It is certified that error appears in the above-identified patent and that said Letters Patent is hereby corrected as shown below:

Column 14, lines 22-28 should read:

-- and said linkage means of said actuating means includes:

engaging means for engaging said body to cause pivoting of said body relative to said wheel means;

and said disconnect means for actuating said releasably connecting means to disconnect said body from said connecting means. --.

UNITED STATES PATENT AND TRADEMARK OFFICE
CERTIFICATE OF CORRECTION

PATENT NO. : 4,836,610

DATED : June 6, 1989

INVENTOR(S) : Charles W. Doering et al

It is certified that error appears in the above-identified patent and that said Letters Patent is hereby corrected as shown below:

Column 15, lines 8-15 should read:

-- one of said first links having one end pivotally connected to the other end of said one arm of said frame pivotal mounting means and the other of said first links having one end pivotally connected to the other end of said other arm of said frame pivotal mounting means;

linkage means pivotally supported by said body;

and each of said first links having its other end pivotally connected to said linkage means. --.

UNITED STATES PATENT AND TRADEMARK OFFICE
CERTIFICATE OF CORRECTION

PATENT NO. : 4,836,610

DATED : June 6, 1989

INVENTOR(S) : Charles W. Doering et al

It is certified that error appears in the above-identified patent and that said Letters Patent is hereby corrected as shown below:

Column 16, lines 9-11 should read:

-- a canopy including:

a frame;

and cover means mounted on said frame; --.

Column 16, line 24, "form" should read -- from --.

Signed and Sealed this

Thirteenth Day of February, 1990

Attest:

JEFFREY M. SAMUELS

Attesting Officer    Acting Commissioner of Patents and Trademarks